(12) United States Patent
Kaneko

(10) Patent No.: US 11,838,646 B2
(45) Date of Patent: Dec. 5, 2023

(54) APPARATUS, METHOD, AND STORAGE MEDIUM FOR DECIDING AN EXPOSURE CONDITION BASED ON BRIGHTNESS OF A COMBINED AREA OF A CAPTURED IMAGE

(71) Applicant: CANON KABUSHIKI KAISHA, Tokyo (JP)

(72) Inventor: Seigo Kaneko, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/714,034

(22) Filed: Apr. 5, 2022

(65) Prior Publication Data

US 2022/0329719 A1 Oct. 13, 2022

(30) Foreign Application Priority Data

Apr. 8, 2021 (JP) ................. 2021-065644

(51) Int. Cl.
| | |
|---|---|
| *H04N 23/73* | (2023.01) |
| *H04N 23/61* | (2023.01) |
| *H04N 23/71* | (2023.01) |
| *H04N 23/741* | (2023.01) |
| *G06T 7/50* | (2017.01) |
| *G06T 7/10* | (2017.01) |
| *G06T 7/70* | (2017.01) |

(52) U.S. Cl.
CPC ............. *H04N 23/73* (2023.01); *G06T 7/10* (2017.01); *G06T 7/50* (2017.01); *G06T 7/70* (2017.01); *H04N 23/61* (2023.01); *H04N 23/71* (2023.01); *H04N 23/741* (2023.01); *G06T 2207/20021* (2013.01); *G06T 2207/20212* (2013.01)

(58) Field of Classification Search
CPC ........ H04N 23/73; H04N 23/61; H04N 23/71; H04N 23/741; H04N 23/72; H04N 23/671; G06T 7/10; G06T 7/50; G06T 7/70; G06T 2207/20021; G06T 2207/20212
See application file for complete search history.

(56) References Cited

U.S. PATENT DOCUMENTS

| | | | | |
|---|---|---|---|---|
| 2009/0046947 | A1* | 2/2009 | Kobayashi | H04N 23/73 382/284 |
| 2015/0206333 | A1* | 7/2015 | Crockett | G06F 40/103 715/202 |
| 2018/0241949 | A1* | 8/2018 | Kawai | H04N 23/685 |

FOREIGN PATENT DOCUMENTS

JP 2007228201 A 9/2007

* cited by examiner

Primary Examiner — Ahmed A Berhan
(74) Attorney, Agent, or Firm — CANON U.S.A., INC. IP Division

(57) ABSTRACT

An apparatus includes an acquisition unit configured to acquire distance information indicating a distance to an object included in each of divided areas of an imaging area, a creation unit configured to create a combined area that is obtained by combining divided areas based on the acquired distance information and positions of the divided areas in the imaging area, and a decision unit configured to decide an exposure condition of the created combined area.

19 Claims, 4 Drawing Sheets

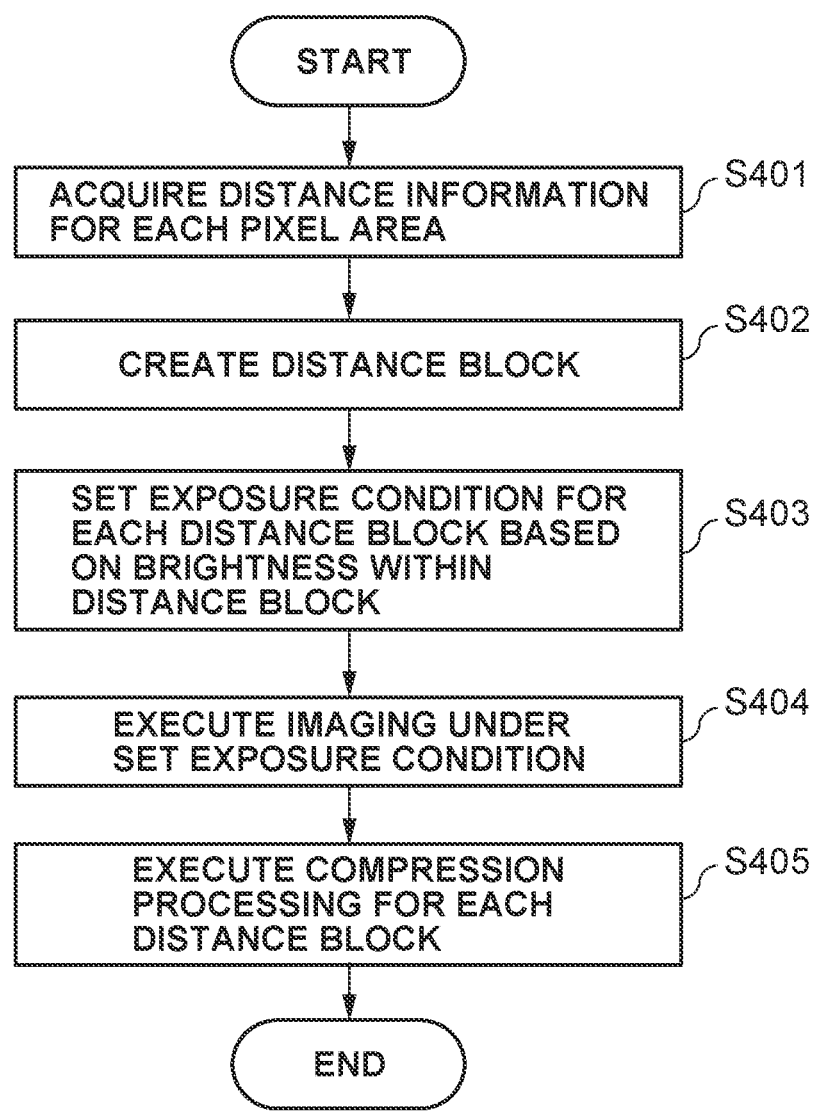

US 11,838,646 B2

APPARATUS, METHOD, AND STORAGE MEDIUM FOR DECIDING AN EXPOSURE CONDITION BASED ON BRIGHTNESS OF A COMBINED AREA OF A CAPTURED IMAGE

BACKGROUND

Technical Field

The aspect of the embodiments relates to an imaging control apparatus, an imaging control method, and a storage medium.

Description of the Related Art

Japanese Patent Application Laid-Open No. 2007-228201 discusses a technique for deciding an auto-exposure (AE) target area where brightness of a predetermined target image portion detected from an object image is acquired, and deciding an exposure amount of a solid-state electronic image sensor, based on image data expressing an image within the decided AE target area.

SUMMARY

According to an aspect of the embodiments, an apparatus includes an acquisition unit configured to acquire distance information indicating a distance to an object included in each of divided areas of an imaging area, a creation unit configured to create a combined area that is obtained by combining divided areas based on the acquired distance information and positions of the divided areas in the imaging area, and a decision unit configured to decide an exposure condition of the created combined area.

Further features of the disclosure will become apparent from the following description of exemplary embodiments with reference to the attached drawings.

BRIEF DESCRIPTION OF THE DRAWINGS

FIG. 4 is a flowchart illustrating imaging processing according to a present exemplary embodiment.

DESCRIPTION OF THE EMBODIMENTS

Hereinafter, exemplary embodiments of the disclosure will be described in detail with reference to the appended drawings. The following exemplary embodiments are not intended to limit the disclosure, and not all of combinations of features described in the exemplary embodiments are required as the solutions of the disclosure. Configurations described in the exemplary embodiments can be modified or changed as appropriate in accordance with specifications of an apparatus to which the disclosure is applied or various conditions, such as a use condition and a use environment. A technical range of the disclosure is confirmed by a scope of the appended claims, and should not be limited to each of the exemplary embodiments described below.

Figure 1:
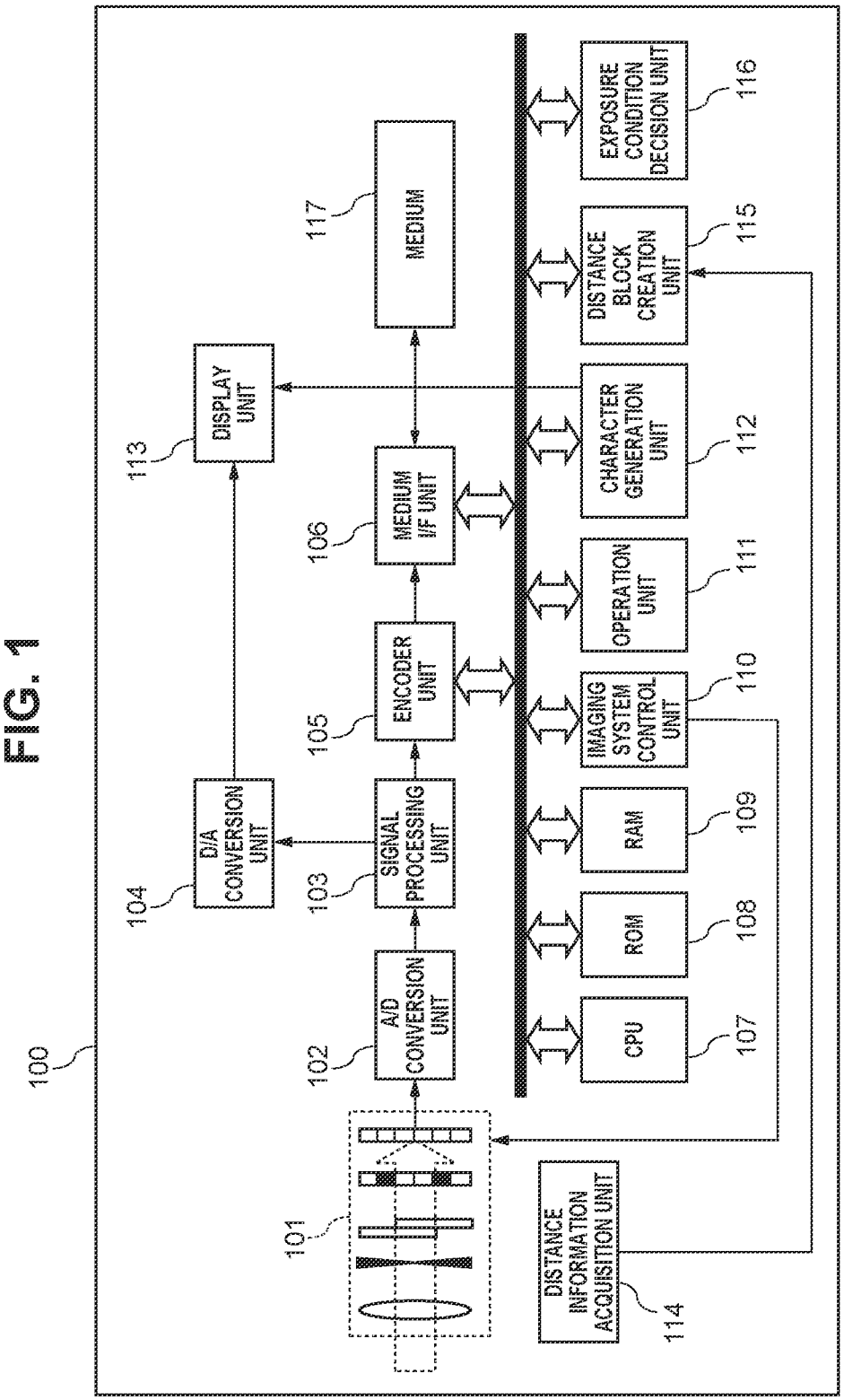
FIG. 1 is a block diagram illustrating an example of a configuration of an imaging apparatus according to a present exemplary embodiment.

FIG. 1 is a block diagram illustrating an example of a configuration of an imaging apparatus according to a first exemplary embodiment.

Among functions of functional modules included in an imaging apparatus 100 in FIG. 1 are functions implemented by software, and a program for providing each of the functions of the functional modules is stored in a memory, such as a read only memory (ROM). Then, a central processing unit (CPU) implements the function by reading out the program to a random access memory (RAM) and executing the program. Among the functions of functional modules, each function implemented by hardware is, for example, implemented by automatically generating a dedicated circuit on a Field Programmable Gate Array (FPGA) by using a predetermined compiler based on a program for implementing the function of a corresponding functional module. Each of the functions may be implemented as hardware by forming a gate array circuit using a method similar to the method of the FPGA. The function may be implemented by an application specific integrated circuit (ASIC). A functional block configuration illustrated in FIG. 1 is merely an example, and a plurality of functional blocks may constitute a single functional block, or any one of the functional blocks may be divided into functional blocks for executing a plurality of functions.

In FIG. 1, the imaging apparatus 100 can set an exposure condition including, for example, a shutter speed and an analog gain, for each divided area of an imaging area, and can control the exposure condition for each of the divided areas to capture an image. Each of the divided area may be configured of a single pixel or a plurality of pixels. In a case where the divided area is configured of a plurality of pixels, an imaging area may be divided into blocks. The imaging apparatus 100 may be used as a single unit, or may be mounted on a smartphone or a monitoring apparatus.

In the present exemplary embodiment described below, a single pixel or a plurality of pixels that is controlled under the same exposure condition (i.e., exposure time and analog gain) may be called a "pixel area". A pixel area can be configured of a divided area(s) of an imaging area. Each of pixel areas may be configured of a different number of pixels. In order to reduce a load of image processing, the imaging apparatus 100 may collectively control a plurality of pixel areas to which the same exposure condition is set.

The imaging apparatus 100 includes an imaging unit 101, an analog/digital (A/D) conversion unit 102, a signal processing unit 103, a digital/analog (D/A) conversion unit 104, an encoder unit 105, and a medium interface (I/F) unit 106. Further, the imaging apparatus 100 includes a CPU 107, a ROM 108, and a RAM 109. Furthermore, the imaging apparatus 100 includes an imaging system control unit 110, an operation unit 111, a character generation unit 112, a display unit 113, a distance information acquisition unit 114, a distance block creation unit 115, and an exposure condition decision unit 116.

The imaging unit 101 detects light from an object for each pixel. For example, the imaging unit 101 includes a zoom lens, a focus lens, a camera-shake correction lens, an aperture, a shutter, an optical low-pass filter, an infrared rays (IR) cut filter, a color filter, and an image sensor. For example, the image sensor is a complementary metal oxide semiconductor (CMOS) sensor or a charge coupled device (CCD) sensor.

The A/D conversion unit 102 converts a detection amount of light from the object into a digital value.

The signal processing unit 103 executes signal processing of the digital value output from the A/D conversion unit 102 and generates a digital image. Examples of the signal processing that is performed by the signal processing unit 103 include de-mosaic processing, white balance processing, and gamma processing.

The D/A conversion unit 104 converts a digital image generated by the signal processing unit 103 into a display image by analog conversion processing.

The encoder unit 105 executes data compression processing on the digital image generated by the signal processing unit 103. For example, the encoder unit 105 executes data compression processing by a Joint Photographic Experts Group (JPEG) method.

The medium I/F unit 106 is an interface for connecting the imaging apparatus 100 to a medium 117. Examples of the medium 117 include a hard disk, a memory card, a compact flash (CF) card, a secure digital (SD) card, or a universal serial bus (USB) memory. The medium 117 may be a personal computer (PC).

The CPU 107 executes processing of the entire imaging apparatus 100. The ROM 108 and the RAM 109 provide a program, data, and a work area to be used for the processing to the CPU 107. In a case where a control program that is used for the below-described processing is stored in the ROM 108, the control program is read into the RAM 109 once, and executed by the CPU 107.

The CPU 107 may be a graphics processing unit (GPU), a single-core processor, or a multi-core processor. The CPU 107 may have a function for operating as a neural network.

The operation unit 111 receives an instruction from a user. For example, the operation unit 111 is a button, a mode dial, or a touch panel attached to the display unit 113.

The character generation unit 112 generates a numeric character, a letter, a symbol, and a graphic, displayed on the display unit 113.

The display unit 113 displays images, such as a captured image and a graphical user interface (GUI). Examples of the display unit 113 include a cathode-ray tube (CRT) display, a liquid crystal display, or a touch screen. An input received by the touch screen can be processed as an input received by the operation unit 111.

The distance information acquisition unit 114 acquires distance information indicating a distance to an object included in a divided area of an imaging area. Further, the distance information acquisition unit 114 transmits the acquired distance information to the distance block creation unit 115. The distance information acquisition unit 114 may include a distance information calculation unit for calculating a distance from the imaging unit 101 to the object. The distance information can be calculated based on at least any one of the methods, such as image plane phase difference auto-focus (AF) using an imaging optical system, contrast AF using an imaging optical system, range-finding detection using optical detection, object identification using image recognition, and background differencing.

In a case where a distance is calculated by the image plane phase difference AF, for example, one or more pixels for use in the image plane phase difference AF are disposed in each pixel area. With this configuration, the distance information acquisition unit 114 can calculate a distance to an object for each pixel area. By the image plane phase difference AF, since a distance to an object can be calculated from a phase difference on the image plane, distance information can be calculated for each pixel area as well as each frame.

The distance information acquisition unit 114 may acquire an evaluation value for each pixel area by using contrast AF, and estimate a distance to an object from a position where the object is in focus. Alternatively, a ranging technique using light detection typified by a light detection and ranging (LIDAR) technique can also be used. Furthermore, the distance information acquisition unit 114 may identify a distance to an object by image recognition. In this case, the distance information acquisition unit 114 estimates a distance for each pixel area, based on a size of an object within the imaging field angle. More specifically, for example, a size of a specific object, such as a human or a vehicle, is fixed to some extent. In a case where an object identification method is to be used, the distance information acquisition unit 114 estimates a distance to an object based on information about an object having a size fixed to some extent. In a case where there is a pixel area where a distance cannot be detected by the above-described distance information detection methods, the distance information acquisition unit 114 estimates the distance based on distance information on pixel areas in the periphery of the pixel area, e.g., an average value of the distance information on the peripheral pixel areas.

The user may optionally input and set distance information for each pixel area. The distance information acquisition unit 114 may divide an imaging area into a foreground and a background by image recognition, and determines a relative distance between the foreground and the background. In this case, a special ranging mechanism, e.g., a pixel for use in the image plane phase difference AF, does not have to be disposed as a ranging unit. A background differencing technique may also be used for dividing an imaging area into a background and a foreground. In this technique, a determination is performed based on a temporal change of brightness within a same pixel instead of a difference in brightness among pixels at a same point in time. Thus, the distance information acquisition unit 114 can acquire distance information even in an imaging area having brightness gradient in a deteriorated condition.

In a case where the distance information acquisition unit 114 does not have a mechanism for acquiring distance information on each pixel area for all pixel areas, the distance information acquisition unit 114 may execute complementary processing for linearly complementing distance information based on a change amount of distance information acquired at a plurality of pixel positions. Alternatively, the distance information acquisition unit 114 may collectively measure a distance for a plurality of pixel areas. However, in this case, the exposure condition decision unit 116 sets an exposure condition for each pixel area obtained by combining a plurality of pixel areas. In a case where distances are measured at a plurality of pixels within one pixel area, the distance information acquisition unit 114 calculates an average value, a median value, or a mode value of a histogram from a plurality of pieces of acquired distance data, and may determine the acquired value as distance information on the one pixel area.

The distance block creation unit 115 creates a distance block based on the distance information acquired from the distance information acquisition unit 114 and a position of a pixel area including an object corresponding to the distance information. The distance block may include a combined area that has been obtained by combining pixel areas based on the distance information acquired from the distance information acquisition unit 114 and a position of the pixel area including an object corresponding to the distance information. A shape of the distance block is not limited to a square shape or a rectangular shape, and can be a polygonal shape.

The distance block creation unit 115 calculates a relative distance between pixel areas from distance information on the pixel areas, and creates a distance block based on the relative distance. For example, among a plurality of pixel areas, in a case where some pixel areas have relative distances close to an object, the distance block creation unit 115 determines that each of the pixel areas capture an object (area) image nearby, and determines that the pixel areas are the same distance block. In this process, a threshold may be set as a reference for the determination of whether a relative distance to an object is a close distance or a far distance, and with respect to pixel areas having relative distances less than or equal to the threshold, the distance block creation unit 115 may determine that the pixel areas are the same distance block. In one embodiment, a designer or a user sets the threshold, based on information, such as distance information on the entire image (i.e., a maximum distance value, a minimum distance value, an average distance value, or a median distance value), an imaging field angle, a focal distance, and limitations of a size of the distance block (i.e., a minimum size and an upper limit number). With this configuration, it is possible to prevent lowering of a gradient, which is caused by a considerable decrease in the number of distance blocks, and an increase in the processing load of the CPU 107, which is caused by a considerable increase in the number of distance blocks. The distance block creation unit 115 may create a distance block, based on a relative distance of a foreground and a background defined by image recognition.

In one embodiment, a distance block is configured of pixel areas adjacent to each other. With this configuration, the distance block creation unit 115 can determine a plurality of different objects as objects different from each other, in a case where the plurality of different objects is close to each other within a range where these objects do not overlap (are not in contact) at an imaging field angle, and thus executes creation processing of distance blocks. However, in a case where a plurality of different objects close to each other is to be collectively processed, in one embodiment, the distance block creation unit 115 creates a distance block using not only pixel areas adjacent to each other. In one embodiment, only when pixel areas in the image has a close positional relationship (i.e., a close pixel distance between the pixel areas), the distance block creation unit 115 determines that objects are close to each other also in a three-dimensional space, and determines that the pixel areas are the same distance block. In this case, a threshold is set with respect to a positional relationship between two or more pixel areas in the image. Then, in a case where the positional relationship is less than or equal to the threshold, the distance block creation unit 115 determines that the pixel areas are the same distance block.

The exposure condition decision unit 116 decides an exposure condition of the distance block created by the distance block creation unit 115. In this process, the exposure condition decision unit 116 may set a limit on a setting range of exposure conditions of the distance block. For example, in a case where a relative distance with respect to an object within a distance block is short, the exposure condition decision unit 116 may set a difference between setting values of exposure conditions of adjacent pixel areas to be smaller than setting values of a case where a relative distance with respect to the object is long. Alternatively, the exposure condition decision unit 116 may decide to set a same value for the exposure conditions of all of pixel areas within a same distance block. Further, in a case where a difference in brightness within a distance block is less than or equal to a threshold, the exposure condition decision unit 116 may narrow a setting range of an exposure condition in a same distance block. Furthermore, the exposure condition decision unit 116 may set a limit on a setting range of an exposure condition for a distance block on which image recognition is to be executed or a distance block from which an image recognition target is detected.

The imaging system control unit 110 follows an instruction from the CPU 107 to execute control of an imaging system. The imaging system control unit 110 sets an exposure condition including, for example, a shutter speed and an analog gain to the imaging unit 101 for each pixel or each pixel area. In this process, the imaging system control unit 110 can apply the exposure condition decided by the exposure condition decision unit 116 to the imaging unit 101. The imaging system control unit 110 also executes control processing such as focus adjustment, opening and closing of a shutter, and aperture adjustment.

While, the imaging apparatus 100 may include various constituent elements other than the above-described constituent elements, descriptions thereof are omitted.

The distance block creation unit 115 acquires distance information on an object for each area within an imaging field angle, and creates a distance block by combining areas having distances relatively close to an object. Then, the exposure condition decision unit 116 sets a same value for the exposure conditions in the distance block, and causes the imaging unit 101 to execute image capturing reflecting the exposure conditions, via the imaging system control unit 110. In this way, the exposure condition decision unit 116 enables the imaging unit 101 to execute imaging under the exposure conditions different among distance blocks in the entire image, whereby a dynamic range of the entire image can be improved, and lowering of a gradient of an image imaged in a distance block can be suppressed.

For example, because an exposure condition can be set for each area, the imaging apparatus 100 can expand a dynamic range of a captured image by imaging a dark area to be slightly brighter by increasing an exposure amount of the dark area, and by imaging a bright area to be slightly darker by decreasing an exposure amount of the bright area. In this case, while it is beneficial in expanding a dynamic range by an exposure condition set for each area based on brightness of an area, contrast will be lowered. Thus, with respect to an object for which sharp contrast is an essential, the object cannot easily be recognized visually as well as mechanically, and consequently, false recognition is likely to occur. The objects for which a sharp contrast is an essential, e.g., blue, yellow, and red traffic lights, a black and white pattern of a pedestrian crossing, and characters printed on a signboard, generally exists together within a close relative distance.

The distance block creation unit 115 creates a distance block by combining areas of which relative distances to an object is relatively close, and thus the exposure condition decision unit 116 can set a same value for the exposure conditions in the distance block. Consequently, by setting a limit on the exposure conditions in the same distance block, the exposure condition decision unit 116 enables the imaging apparatus 100 to execute imaging of objects having a three-dimensionally close relative distance under the exposure conditions close to each other. As a result, even in a case where a sharp contrast is an essential factor for the object having a depth, the exposure condition decision unit 116 enables the imaging apparatus 100 to capture an image keeping contrast of the object, whereby recognition accuracy can be improved. For example, the distance block creation unit 115 determines that areas of blue, yellow, and red traffic lights are the same distance block, and thus the exposure condition decision unit 116 enables the imaging apparatus to image the areas of the blue, yellow, red traffic lights under the exposure conditions close to each other, whereby contrast between the areas can be unchanged. The distance block creation unit 115 determines that a black pattern and a white pattern of a pedestrian crossing are the same distance block, and thus the exposure condition decision unit 116 enables the imaging apparatus 100 to image the black pattern and the white pattern of the pedestrian crossing under the close exposure conditions, whereby contrast between the patterns can be unchanged.

As described above, according to the present exemplary embodiment, the imaging apparatus 100 decides the exposure condition of the combined area that has been obtained by combining divided areas based on distance information indicating a distance to an object included in each of the divided areas of the imaging area and positions of the divided areas in the imaging area. With this configuration, the imaging apparatus 100 can set an appropriate exposure condition while lowering of a gradient of the object is prevented or suppressed.

In the example in FIG. 1, the distance information acquisition unit 114, the distance block creation unit 115, and the exposure condition decision unit 116 are illustrated as the functional blocks different from the CPU 107. However, the imaging control processing executed by the distance information acquisition unit 114, the distance block creation unit 115, and the exposure condition decision unit 116 may be executed by the CPU 107 as a part of the functions executed by the CPU 107.

Figure 2:
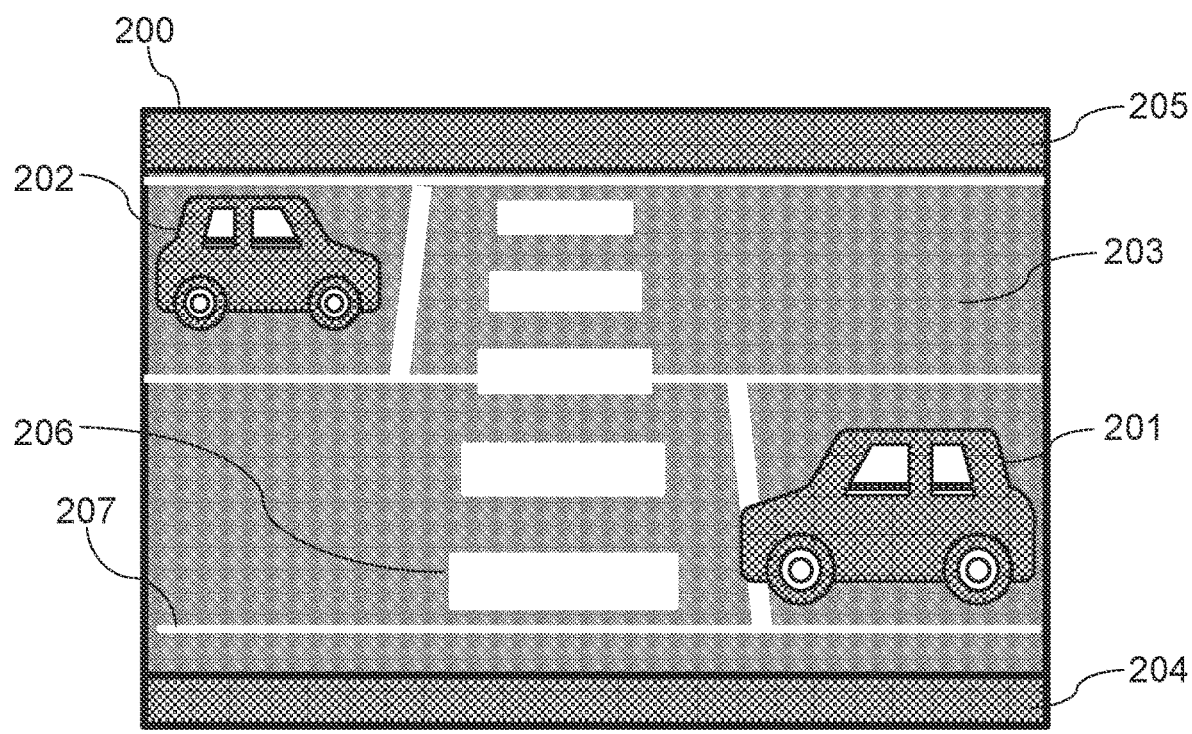
FIG. 2 is a diagram illustrating an example of a captured image according to a present exemplary embodiment.

FIG. 2 is a diagram illustrating an example of a captured image according to the present exemplary embodiment. In the present exemplary embodiment, illustration of a pixel area is omitted because the pixel area is configured of a small number of pixels and is tiny enough with respect to an image size. However, the aspect of the embodiments is applicable as long as at least two pixel areas exist in the image.

In FIG. 2, as main objects, vehicles 201 and 202, a road 203, walkways 204 and 205, a pedestrian crossing 206, and a white line 207 of the road 203 are included in a captured image 200. The vehicle 201 and the walkway 204 are at a near distance from an imaging plane. The vehicle 202 and the walkway 205 are at a far distance from the imaging plane. The pedestrian crossing 206 has a depth, and extends from a position within a short distance from the imaging plane to a position within a long distance from the imaging plane.

The distance block creation unit 115 compares pieces of distance information on pixel areas including objects, and calculates relative distances between objects included in the pixel area. In this process, the distance block creation unit 115 sets a threshold with respect to the relative distances, and in a case where a relative distance between objects is less than or equal to the threshold, the distance block creation unit 115 determines that a distance between the objects is close to each other, and determines that the objects are a same distance block.

In the captured image 200, the vehicle 201 is in contact with the road 203 and the white line 207 of the road 203 in a two-dimensional plane. However, the vehicle 201 is an object having a height with respect to the road 203 and the white line 207 of the road 203. Thus, when a distance from the imaging plane to an object is considered, the relative distance of the vehicle 201 with respect to the road 203 and the white line 207 on the road 203 is more than or equal to the threshold, and thus the distance block creation unit 115 determines that the vehicle 201 is a distance block different from a distance block of the road 203 and the white line 207 on the road 203. However, a tire of the vehicle 201 is in contact with a surface of the road 203, and thus the relative distance of the vehicle 201 and the road 203 is reduced in the tire contact portion. Accordingly, based on a simple relative distance between objects, the distance block creation unit 115 cannot determine that the objects are different distance blocks even though these objects are different from each other. Consequently, in one embodiment, the distance block creation unit 115 determines a contact surface of the vehicle 201 and define a distance block by using the contact surface as a boundary. A determination method of the contact area will be described below.

Similarly, the vehicle 202 is an object having a height with respect to the road 203 and the white line 207 on the road 203. Thus, the distance block creation unit 115 determines that the vehicle 202 is a distance block different from a distant block of the road 203 and the white line 207 of the road 203.

The road 203 on the lower side of the image at a relatively near distance from the imaging plane, and the road 203 on the upper side of the image is at a relatively far distance from the imaging plane. With respect to the object of which distance from the imaging plane to the object varies depending on a position in the image as described above, as long as the distance to the object does not vary abruptly but varies gradually between the pixel areas, relative distances of one pixel area and another pixel area to the object become close to each other, whereby the distance block creation unit 115 determines that the pixel areas are the same distance block. In FIG. 2, the distance block creation unit 115 determines that the road 203, the walkways 204 and 205, the pedestrian crossing 206, and the white line 207 of the road 203 are the same distance block because relative distances between the objects are close to each other. The distance block creation unit 115 creates a distance block illustrated in FIG. 3 based on these determination results.

Figure 3:
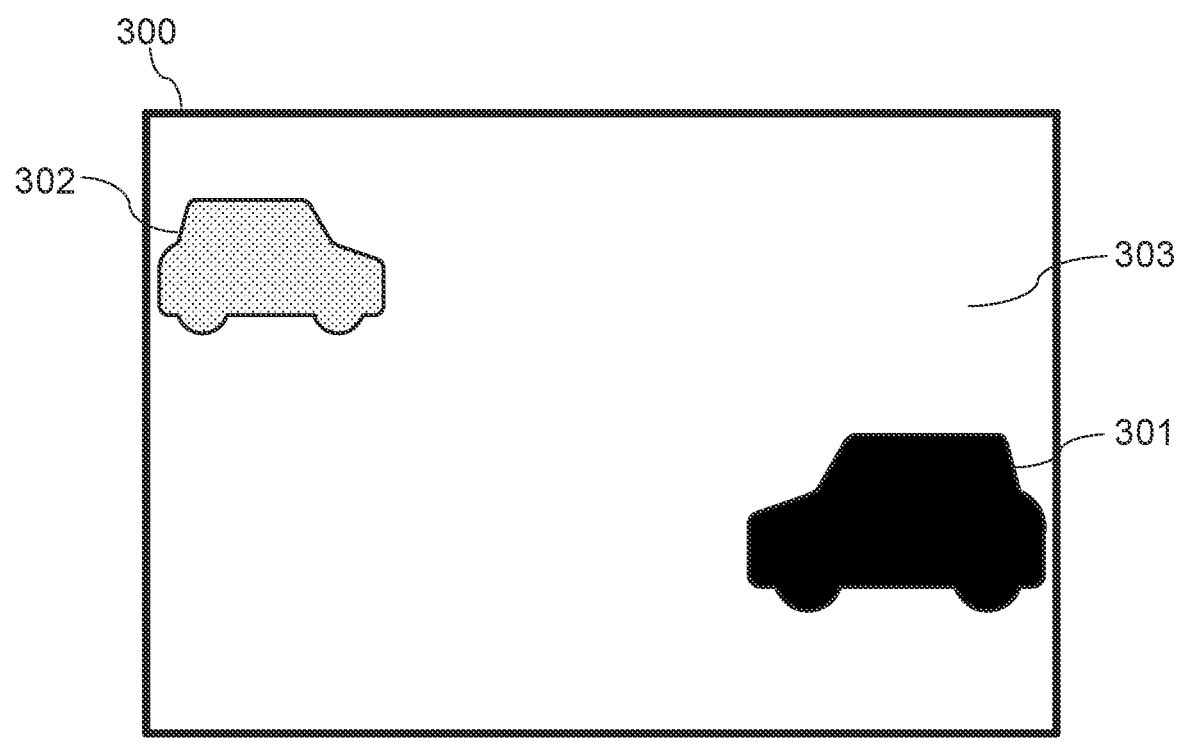
FIG. 3 is a diagram illustrating an example of creation of a distance block of the captured image in FIG. 2.

FIG. 3 is a diagram illustrating a creation example of distance blocks of the captured image in FIG. 2.

In FIG. 3, for example, the distance block creation unit 115 creates a distance block map 300 based on the captured image 200 in FIG. 2. The distance block map 300 includes distance blocks 301 to 303.

The distance block 301, which is a black-dot pixel area, is a solid-black area where the vehicle 201 in FIG. 2 is imaged. The distance block 302, which is a black-dot pixel area, is an area where the vehicle 202 in FIG. 2 is imaged. The distance block 303, which is a solid-white pixel area, is an area where the road 203, the walkways 204 and 205, the pedestrian crossing 206, and the white line 207 of the road 203 in FIG. 2 are imaged. As described above, the distance block creation unit 115 can create the three distance blocks 301 to 303 from the captured image 200 in FIG. 2.

Herein, because the exposure condition can be set for each area, the imaging apparatus 100 can expand a dynamic range of a captured image by imaging a dark area to be slightly brighter by increasing an exposure amount of the dark area, and by imaging a bright area to be slightly darker by decreasing an exposure amount of the bright area. However, if the exposure condition is set in such a state that a dynamic range of the pedestrian crossing 206 in FIG. 2 is expanded, a brightness gradient of the pedestrian crossing 206 is deteriorated, even though a brightness gradient of the black and white colors is an essential factor for the pedestrian crossing 206.

If a brightness gradient of the above-described object is deteriorated, a black line and a white line of the pedestrian crossing 206 cannot easily be identified, and consequently, image recognition accuracy is lowered. In the above-described scene where a difference in brightness is compared, brightness is changed depending on a light source (environment). Thus, the black line and the white line of the pedestrian crossing 206 at a near distance are required to be recognizable.

As illustrated in FIG. 3, the distance block creation unit 115 can determine that the object, such as the pedestrian crossing 206 in FIG. 2, of which brightness gradient of the black and white colors is an essential factor, is the same distance block 303. Then, the exposure condition decision unit 116 causes the imaging apparatus 100 to execute imaging under the same exposure condition for the pixel areas in the same distance block, whereby lowering of a gradient can be prevented or suppressed. As a result, the exposure condition decision unit 116 enables the imaging apparatus 100 to acquire an image having a difference in brightness of the black and white lines in the imaging area of the pedestrian crossing 206 while a dynamic range of the entire captured image 200 is expanded.

In the captured image 200, a distance to the object on the lower side of the image is short, and a distance to the object on the upper side of the image is long. Thus, a distance from the imaging apparatus 100 to the road 203 varies depending on a position in the image. Accordingly, in order to determine that the entire road 203 is the same distance block 303, the distance block creation unit 115 compares relative distances of the pixel areas with each other instead of comparing absolute values of distances of pixel areas with each other, and determines that pixel areas having close relative distances are a continuous object (object having a depth). Alternatively, the distance block creation unit 115 may create a distance block by using absolute values in a case where a scene having a small depth is imaged.

In the example illustrated in FIG. 3, the distance block creation unit 115 determines that there are the three distance blocks 301 to 303. However, the number of distance blocks varies in accordance with the threshold of the relative distances. In a case where the distance information acquired by the distance information acquisition unit 114 is accurate enough, the distance block creation unit 115 can increase the number of distance blocks by easing the threshold. For example, the distance block creation unit 115 can identify all of the road 203, the walkways 204 and 205, the pedestrian crossing 206, and the white line 207 of the road 203 as distance blocks different from each other by easing the threshold. In this way, the exposure condition decision unit 116 can set an exposure condition for each of finely-divided distance blocks, whereby a highly-precise gradient can be achieved for each object while a dynamic range is expanded. The number of distance blocks can be decreased by setting a limit on the threshold. In this case, the exposure condition decision unit 116 can reduce a load of the processing for setting an exposure condition.

FIG. 4 is a flowchart illustrating imaging processing according to the present exemplary embodiment.

The distance block creation unit 115 and the exposure condition decision unit 116 read out a program stored in a storage unit of the imaging apparatus 100 in FIG. 1 and execute the program to implement each of processing procedures in FIG. 4. At least a part of the processing procedures of the flowchart in FIG. 4 may be implemented by hardware. When a processing step is to be implemented by hardware, for example, a predetermined compiler is used so that a dedicated circuit can automatically be generated on an FPGA from a program for implementing the processing step. A processing step may be implement by hardware by forming a gate array circuit by a method similar to the method for the FPGA. Further, a processing step may be implemented by an application specific integrated circuit (ASIC).

In this case, each of the blocks in the flowchart illustrated in FIG. 4 can be regarded as a hardware block. A plurality of blocks may be integrated to constitute one hardware block, and one block may be configured as a plurality of hardware blocks.

In step S401 in FIG. 4, the distance block creation unit 115 acquires distance information on an object for each pixel area from the distance information acquisition unit 114.

Next, in step S402 in FIG. 4, the distance block creation unit 115 creates a distance block based on the distance information acquired from the distance information acquisition unit 114 and a position of the pixel area including the object corresponding to the distance information.

Next, in step S403 of FIG. 4, for each distance block, the exposure condition decision unit 116 sets a same value for the exposure conditions of all pixel areas. In this process, in order to apply an appropriate exposure to each of the distance blocks, the exposure condition decision unit 116 may decide an exposure condition which applies an appropriate exposure based on the brightness in a distance block in a captured image and the exposure condition set when imaging of the captured image has been executed. Under the appropriate exposure condition, a data gap such as underexposure or overexposure is reduced, and thus an image captured with appropriate brightness and having high visibility can be acquired.

In step S404 of FIG. 4, the imaging system control unit 110 causes the imaging unit 101 to execute imaging based on the exposure condition set in step S403.

Next, in step S405 of FIG. 4, the encoder unit 105 executes image processing, such as compression processing for each distance block. By the above-described processing, the imaging apparatus 100 acquires an image captured under the exposure appropriate for each distance block, which is compressed by a compression amount at a minimum for each distance block. Accordingly, the imaging apparatus 100 can acquire an image in which lowering of a brightness gradient is prevented or suppressed for each distance block. As a whole image, the imaging apparatus 100 can acquire an image with an improved dynamic range because exposure conditions different among the distance blocks can be set for the distance blocks. Accordingly, by setting the exposure condition for each distance block, the imaging apparatus 100 can acquire an image in which lowering of a brightness gradient is suppressed while a dynamic range is expanded, regardless of the number of objects or an object type. Herein, "object type" may refer some other physical objects, such as a person, a vehicle, and a road, in addition to a foreground and a background.

In a case of the imaging apparatus 100 capable of setting an exposure condition for each pixel area, an image with an expanded dynamic range can be acquired by executing image capturing under exposure conditions different among pixel areas. On the other hand, even though a range of brightness (i.e., data amount) is expanded, the data has to be compressed because there are restrictions on the amount of data displayed as image data and a capacity of the CPU 107 that executes image processing. Consequently, the compression ratio is increased as the range of brightness (data amount) is expanded, and a brightness gradient is lowered accordingly.

For example, a description will be given of a case where two areas, a darkest area (14 bits) and a brightest area (14 bits), are simultaneously imaged by using an image sensor capable of expressing a single exposure amount by 14 bits. In this case, in a case where a value (i.e., maximum value) by which a dark area can be imaged in a brightest state and a value (i e, minimum value) by which a bright area can be captured in a darkest state do not overlap with each other with a difference of 1 bit, the image sensor images data by 28-bit (14 bits+14 bits). Thus, the brightness gradient is not deteriorated.

However, in practice, data compression is executed in accordance with restrictions, such as a case where a final output data format is fixed to JPEG (8 bits). In a case where data is to be compressed to 8 bits, 28-bit data is compressed to 8-bit data. In this case, the imaging apparatus 100 can set a same value for the exposure conditions in the same distance block, and 14-bit data is compressed to 8-bit data. Thus, lowering of the gradient caused by data compression can be prevented or suppressed.

Hereinafter, with reference to FIGS. 2 and 3, an additional description will be provided of a determination method of the contact area.

Because relative distances to objects is close at a contact surface of the vehicle 201 and the road 203, the distance block creation unit 115 may have difficulty in determining that the vehicle 201 and the road 203 are different distance blocks by simply referring to the relative distance. As described above, even in a case where the distance block creation unit 115 determines that the objects have difference in distances, the distance block creation unit 115 cannot define distance blocks by simply referring to relative distances in a case where there is a contact surface. Thus, in one embodiment, the distance block creation unit 115 employs a determination method of a distance block different from a determination method using a relative distance. In this case, in one embodiment, the distance block creation unit 115 includes a determination unit for determining a boundary between distance blocks. Further, the distance block creation unit 115 defines distance blocks by taking a position in the image determined as a contact surface as a boundary.

For example, in a relationship of a relative distance between the vehicle 201 and the road 203 in FIG. 2, a relative distance to the road 203 from a roof of the vehicle 201 where the vehicle 201 has the highest height has a greatest value. On the other hand, a relative distance to the road 203 from a tire of the vehicle 201 where the vehicle 201 has the lowest height has the smallest value, and a relative distance is zero at the contact surface. As described above, the distance block creation unit 115 has to determine that the vehicle 201 and the road 203 are different distance blocks at a position where the relative distance between the vehicle 201 and the road 203 becomes close after a gradual change of the relative distance. Thus, in order to determine a boundary between the objects of which relative distance varies, a threshold is set with respect a change in the relative distance. Then, the distance block creation unit 115 determines that a position having a value less than or equal to the threshold is the contact surface. Alternatively, the distance block creation unit 115 may determine that a point where a relative distance becomes the smallest value is a contact surface of pixel areas of which relative distance varies.

In order to identify a contact surface, the distance block creation unit 115 may employ image recognition using edge detection in addition to distance information. In a case where a specific object (e.g., the vehicle 201 in FIG. 2) can be identified by the image recognition, the distance block creation unit 115 defines distance blocks at a boundary portion between the specific object and a background (e.g., the road 203 in FIG. 2). By the above-described method, the distance block creation unit 115 can appropriately create distance blocks even in a case where objects have a contact surface.

Alternatively, the distance block creation unit 115 may convert a two-dimensional image into a three-dimensional model by executing image processing and calculate a contact surface to create distance blocks. In one embodiment, the distance block creation unit 115 generates a three-dimensional model from a plurality of viewpoints by using images captured by a plurality of imaging apparatuses or captured from a plurality of positions to identify the contact surface. The distance block creation unit 115 compares changes in brightness of an object in a single image, estimates that a point where the brightness is changed is likely to be a contact surface of objects, and may use a comparison result as supplemental information for making a determination of a contact surface.

A direction of a contact surface is not limited to a horizontal direction, and can be a vertical direction or an oblique direction. For example, in an imaging field angle of the image illustrated in FIG. 2, in a case where a ground surface has already been determined as a contact surface, the distance block creation unit 115 can determine that a contact surface exists in a lower side of the distance block. On the other hand, in a case where the imaging apparatus 100 is inverted vertically, a captured image is inverted accordingly. Thus, the distance block creation unit 115 can determine that a contact surface exists at a boundary on an upper side of the distance block with respect to the captured image.

As described above, in a case where a position of a contact surface of a distance block has already been determined, the distance block creation unit 115 can improve creation accuracy of distance blocks by previously setting a contact surface. A boundary between objects is not limited to a ground surface, and can appear even in a case where objects are in contact with each other. Thus, in one embodiment, determination of a direction of a boundary between objects in an image is also performed with respect to an oblique direction in addition to a horizontal direction and a vertical direction.

In step S403 of FIG. 4, the exposure condition decision unit 116 sets a same value for the exposure conditions of all pixel areas in the same distance block. However, the exposure conditions do not have to be the same. The exposure condition decision unit 116 may set a limit on a setting range of an exposure condition in a distance block and set an exposure condition for each pixel area in the distance block.

In a case where the exposure condition decision unit 116 sets different values to the exposure conditions in a distance block, an imaging brightness range is widened, and a data amount is expanded. Thus, a dynamic range in the distance block can be improved. However, in order to reduce a data compression amount, the exposure condition decision unit 116 has to set a limit on a setting range of an exposure condition. If a setting range of an exposure condition is narrowed, although a brightness gradient in the same distance block is improved, a dynamic range is lowered. On the other hand, if a setting range of an exposure condition is widened, although a brightness gradient in the same distance block is lowered, a dynamic range is improved. Thus, the exposure condition decision unit 116 compares brightness in a distance block for each pixel area, and in a case where a difference in the brightness is large, the exposure condition decision unit 116 places a priority on a dynamic range and widens the setting range of the exposure condition.

However, the exposure condition decision unit 116 sets a limit on a setting range of an exposure condition in at least one distance block to be smaller than a maximum range of an exposure condition settable to the imaging apparatus 100. In this way, the exposure condition decision unit 116 can prevent or suppress lowering of a brightness gradient.

In one embodiment, the exposure condition decision unit 116 sets a difference between setting values of exposure conditions to be smaller with decreasing relative distances to an object among the pixel areas. In this way, with respect to objects, between which a difference in brightness is an essential factor and which exist in a closer distance, imaging capturing in which lowering of the gradient is prevented and suppressed can be executed.

The exposure condition decision unit 116 sets a threshold with respect to a brightness difference in a same distance block to determine whether the brightness difference is small. In this process, if a difference in brightness in the distance block is small, a dynamic range will not be required. Thus, the exposure condition decision unit 116 can prevent or suppress lowering of the gradient by narrowing a setting range of the exposure condition.

The imaging apparatus 100 does not always have to execute the processing relating to a distance block in FIG. 4 (i.e., S401, S402, or S403). The imaging apparatus 100 may start the processing relating to a distance block based on at least any one of a detection accuracy of image recognition, a detection result of image recognition, a range of brightness of the entire image, and a difference in distances of pixel areas in the entire image. For example, the imaging apparatus 100 may start the processing relating to a distance block by using a low image recognition accuracy or lowering of image recognition accuracy as a trigger. In this configuration, the processing in FIG. 4 is not performed in a case where accuracy of image recognition is sufficient, and thus a load of the imaging apparatus 100 can be reduced. The imaging apparatus 100 may start executing the processing relating to a distance block by using, as a trigger, a timing of when an object that has been recognized by image recognition is not recognized.

The imaging apparatus 100 may start executing the processing relating to a distance block by using, as a trigger, a timing of when lowering of the gradient is expected due to a large range of brightness of the entire image. In this configuration, a threshold is set with respect to a range of brightness of the entire image, and thus, in a case where a range of brightness becomes more than or equal to a threshold, the imaging apparatus 100 can start executing the processing relating to a distance block. In a case where a difference between distances of pixel areas in the entire image is small, a distance block is not created, and consequently the imaging apparatus 100 does not have to execute the processing relating to a distance block. Thus, a threshold is set with respect to a difference between distances of pixel areas in the entire image. Then, the imaging apparatus 100 executes the processing relating to a distance block in a case where a difference between distances is greater than the threshold, whereby a processing load can be reduced.

According to the present exemplary embodiment, the imaging apparatus 100 can image all of the pixel areas at a same timing (i.e., one frame). Thus, there is no gap between imaging timings among pixel areas. In other words, because an image can be captured at the same timing, even in a case where different exposure times are applied, failure in imaging an object and occurrence of a double-object image can be reduced in comparison to a case where a plurality of images is imaged for each pixel area. The imaging apparatus 100 does not always have to execute the processing in FIG. 4 for each frame. The imaging apparatus 100 may execute the processing in FIG. 4 for a plurality of frames.

While, the exposure condition decision unit 116 may set an appropriate exposure value for the exposure condition in the distance block, the exposure condition does not always have to be set to the appropriate exposure value. The setting value may be an underexposure value or an overexposure value, and the setting value may be set manually.

The distance block creation unit 115 determines that distance blocks of which block distances are close to each other are also positioned close to each other in a three-dimensional space, and may determine that the distance blocks are the same distance block. In the present exemplary embodiment, a block distance of a distance block is defined as a distance to an object imaged in the distance block. In a case where one distance block has a plurality of pieces of distance information, a block distance can be defined by a median value, an average value, a mode value, a maximum value, or a minimum value of the plurality of pieces of distance information. The exposure condition decision unit 116 can apply the same exposure condition to the distance blocks of which block distances are close to each other. In this configuration, a threshold is set with respect to a difference between block distances of distance blocks, and the exposure condition decision unit 116 determines that one distance block (object) is close to another distance block in a case where a difference is less than or equal to the threshold.

With the above-described configuration, the imaging apparatus 100 can image different objects positioned close to each other under the same exposure condition while a brightness gradient of the different objects is improved. In this configuration, the distance block creation unit 115 may refer to a positional relationship between the distance blocks in the image (i.e., a distance between distance blocks) in addition to a block distance of the distance block. In this way, as with the case of the positional relationship between the pixel areas in the image, the distance block creation unit 115 can estimate that distance blocks which are close to each other in the image are actually positioned close to each other. Thus, the distance block creation unit 115 may consider the distance blocks positioned close to each other in the image to be the same distance block to execute the processing.

The exposure condition decision unit 116 may set a limit on the exposure conditions of adjacent distance blocks. For example, in a case where brightness of images within adjacent distance blocks are close to each other, the exposure condition decision unit 116 increases a difference between the exposure conditions to widen a difference in the brightness of the images within the adjacent distance blocks in the image, and thus a boundary between the adjacent distance blocks can easily be recognized in the image. On the other hand, in a case where brightness of the images within the adjacent distance blocks are close to each other, the exposure condition decision unit 116 may narrow a difference between the exposure conditions. In this case, the exposure condition decision unit 116 reduces a difference in brightness caused by the exposure conditions, to set a boundary between the distance blocks to be hardly recognizable, and consequently a natural-looking image can be captured. In this configuration, a threshold is set with respect to a difference in brightness between the distance blocks in the image. Then, the exposure condition decision unit 116 determines whether a difference in brightness between the distance blocks is more than or equal to the threshold, less than or equal to the threshold.

The exposure condition decision unit 116 does not always have to set the same exposure condition for each distance block with respect to all of distance blocks. The exposure condition decision unit 116 may set the same exposure conditions to at least one distance block. For example, in a case where an area where image recognition is executed is determined previously, or in a case where a target of image recognition is detected, the exposure condition decision unit 116 sets the same exposure condition to the corresponding distance block, and thus a processing load can be reduced. The exposure condition decision unit 116 sets the same exposure condition for each distance block with respect to all of distance blocks, and thus lowering of a gradient can be prevented or suppressed with respect to all of the areas in the image. A distance block of which exposure condition is limited may be specified by the user.

According to the disclosure, a program which implements one or more functions described in the above-described exemplary embodiment may be supplied to a system or an apparatus via a network or a storage medium. Then, one or more functions according to the above-described exemplary embodiments can also be implemented by the processing in which one or more processors in the system or the apparatus read and execute the program. Further, the above-described functions can also be implemented by a circuit (e.g., FPGA or ASIC) which implements one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-065644, filed Apr. 8, 2021, which is hereby incorporated by reference herein in its entirety.

What is claimed is:

1. An apparatus comprising:
sensor that acquires distance information indicating a distance to an object included in each of divided areas of an imaging area;
at least one processor; and
a memory coupled to the at least one processor, the memory having instructions that, when executed by the processor, perform operations as:
a creation unit configured to create a combined area that is obtained by combining divided areas based on the acquired distance information and positions of the divided areas in the imaging area; and
a decision unit configured to decide an exposure condition in the combined area of an image to be captured based on brightness and an exposure condition in the combined area of a captured image.

2. The apparatus according to claim 1, wherein the decision unit sets a limit on a setting range of the exposure condition of the combined area.

3. The apparatus according to claim 1, wherein the creation unit determines that adjacent divided areas each having a relative distance between the adjacent divided areas less than or equal to a first threshold are a same combined area.

4. The apparatus according to claim 3, wherein the first threshold is decided based on at least any one of distance information of an entire image, an imaging field angle, a focal distance, a restriction on a size of the combined area.

5. The apparatus according to claim 3, wherein, the decision unit decreases a difference between setting values of exposure conditions of the adjacent divided areas as the relative distance becomes short.

6. The apparatus according to claim 1, wherein, based on a plurality of pieces of distance information in a same combined area, the acquisition unit calculates a distance of the same combined area.

7. The apparatus according to claim 1, wherein the creation unit determines that combined areas having a distance difference less than or equal to a second threshold are a same combined area.

8. The apparatus according to claim 1, wherein, in a case where a positional relationship between divided areas or combined areas in the captured image is less than or equal to a third threshold, the creation unit determines that the divided areas or the combined areas are a same combined area.

9. The apparatus according to claim 1, wherein the creation unit creates the combined area from divided areas adjacent to each other.

10. The apparatus according to claim 1, wherein, in a case where a brightness difference in the combined areas having substantially same distance information, is less than or equal to a fourth threshold, the decision unit narrows a setting range of exposure conditions in a the combined areas.

11. The apparatus according to claim 1, wherein the decision unit decides to set a same value for the exposure conditions of all pixel areas in a same combined area.

12. The apparatus according to claim 1, wherein the decision unit sets a limit on a setting range of the exposure conditions for a combined area to which image recognition is to be executed or from which an image recognition target has been detected.

13. The apparatus according to claim 1, wherein the distance information is calculated based on at least any one of image plane phase difference auto-focus (AF) using an imaging optical system, contrast AF using an optical system, ranging detection using optical detection, object identification using image recognition, and background differencing.

14. The apparatus according to claim 1, further comprising a determination unit configured to determine a boundary between the combined areas.

15. The apparatus according to claim 14, wherein the determination unit determines a boundary between the combined areas based on at least any one of a preset position of the boundary, a position where a relative distance between adjacent divided areas varies less than or equal to a fifth threshold, a closest point of a relative distance between adjacent divided areas in an area where the relative distance varies, and image recognition.

16. The apparatus according to claim 1, wherein the creation unit starts creation processing of the combined area based on at least any one of a detection accuracy of image recognition, a detection result of the image recognition, a case where a range of brightness of an entire image is more than or equal to a sixth threshold, and a case where a difference between distances of pixel areas in the entire image is more than a seventh threshold.

17. The apparatus according to claim 1, wherein the decision unit decides the exposure condition of the combined area such that a brightness difference of images between adjacent combined areas becomes less than or equal to an eighth threshold or more than or equal to the eighth threshold.

18. A method comprising:
acquiring distance information indicating a distance to an object included in each of divided areas of an imaging area;
creating a combined area that is obtained by combining divided areas based on the acquired distance information and positions of the divided areas in the imaging area; and
deciding an exposure condition in the combined area of an image to be captured based on brightness and an exposure condition in the combined area of a captured image.

19. A non-transitory computer-readable storage medium storing a method, the method comprising:
acquiring distance information indicating a distance to an object included in each of divided areas of an imaging area;
creating a combined area that is obtained by combining divided areas based on the acquired distance information and positions of the divided areas in the imaging area; and
deciding an exposure condition in the combined area of an image to be captured based on brightness and an exposure condition in the combined area of a captured image.

\* \* \* \* \*